(12) United States Patent
Braberg et al.

(10) Patent No.: US 7,233,919 B1
(45) Date of Patent: Jun. 19, 2007

(54) METHOD AND SYSTEM FOR TRACKING TIME AND ATTENDANCE

(75) Inventors: Lennart Braberg, Cambridge, MA (US); Paul J. Piccolomini, Leominster, MA (US); Joseph A Velazquez, Hopkinton, MA (US)

(73) Assignee: Kronos Technology Systems Limited Partnership, Chelmsford, MA (US)

( * ) Notice: Subject to any disclaimer, the term of this patent is extended or adjusted under 35 U.S.C. 154(b) by 0 days.

(21) Appl. No.: 09/524,310

(22) Filed: Mar. 14, 2000

Related U.S. Application Data

(60) Provisional application No. 60/163,432, filed on Nov. 3, 1999.

(51) Int. Cl.
 *G06F 15/02* (2006.01)
(52) U.S. Cl. ...................................................... 705/32
(58) Field of Classification Search ................. 705/32, 705/14; 235/377
 See application file for complete search history.

(56) References Cited

U.S. PATENT DOCUMENTS

| | | | | |
|---|---|---|---|---|
| 4,150,437 | A | 4/1979 | Russell et al. .............. | 364/900 |
| 4,270,043 | A | 5/1981 | Baxter et al. ............... | 235/419 |
| 4,323,771 | A | 4/1982 | Chalker et al. ............. | 235/377 |
| 4,423,315 | A * | 12/1983 | Kato et al. .................. | 235/382 |
| 4,937,599 | A * | 6/1990 | Green ........................ | 346/145 |

(Continued)

FOREIGN PATENT DOCUMENTS

JP 06325066 A * 11/1994

OTHER PUBLICATIONS

Wright, Teresa Burke "Federal Wage $ Hour Requirements Create Traps for the Unwary", Credit Union Magazine, v65n1, pp. 34, Jan. 1999.*

(Continued)

*Primary Examiner*—F. Zeender
*Assistant Examiner*—Mussa Shaawat
(74) *Attorney, Agent, or Firm*—Weingarten, Schurgin, Gagnebin & Lebovici LLP

(57) ABSTRACT

A method for calculating employee compensation includes associating sets of attributes with pay categories. An employee's shifts are split into sub-shifts, responsive to work parameters. A set of attributes is determined for each sub-shift. Each set of attributes is a unique combination of attributes. Sets of attributes are associated with pay categories through a pay category mapping matrix which maps each set of attributes to one or more pay categories. The pay categories with which the set of attributes associated with a particular subshift is associated are then determined responsive to the mapping. A total compensation for an employee is then determined for a pay period by adding the amounts determined for each subshift of the pay period. A compensation qualifier can be associated with each pay category, such that determining compensation for an employee for the sub-shift responsive to the assigned pay category, is in turn responsive to the employee's base pay and the compensation qualifier. One or more pay categories can be tracked. For each tracked pay category, an overflow threshold is specified that is a maximum amount of time that can be accrued in the pay category. A second pay category is specified to receive any amount of time originally assigned to the tracked pay category which is in excess over the threshold. This can be done over various time periods, such as per day or per week.

35 Claims, 5 Drawing Sheets

U.S. PATENT DOCUMENTS 5,459,657 A * 10/1995 Wynn et al.
5,550,359 A     8/1996 Bennett ................. 235/382
5,600,554 A * 2/1997 Williams
5,717,867 A * 2/1998 Wynn et al.
5,819,231 A * 10/1998 Tremaine ................. 705/32
5,842,182 A * 11/1998 Bonner et al. ............ 705/32
5,959,541 A     9/1999 DiMaria et al. ...... 340/825.34
5,978,495 A * 11/1999 Thomopoulos et al. ..... 382/124
6,055,511 A *  4/2000 Luebbering et al. ......... 705/14
6,347,306 B1 * 2/2002 Swart ..................... 705/32
6,401,079 B1 * 6/2002 Kahn et al. .............. 705/30
2002/0069144 A1 * 6/2002 Palardy ................ 705/32

OTHER PUBLICATIONS

Minnesota Nurses Association: "Contrct Enhancements Negotiated for two Nursing Bargaining Units", PR Newswire p2992, Dec. 1999.*

Lyncheski, John E. "Are you in Compliance with the FLSA?", Nursing Homes, v47n9, pp. 30-37, Sep. 1998.*

"Getting The Most From Timeslips: A Practice Guide To Billing And Reporting", Timeslips Corporation, © 1995 see Chapter 3.*

* cited by examiner

| Daily O/T | Weekly O/T | Primary 1 | Primary 2 | Primary 3 | Primary 4 | Special Pay | Pay Category |
|---|---|---|---|---|---|---|---|
| - | - | - | - | - | - | - | Regular |
| Level 1 | - | - | - | - | - | - | Overtime |
| - | Level 1 | - | - | - | - | - | Overtime |
| - | - | Evening | - | - | - | - | Regular, Night |
| - | Level 1 | Evening | - | - | - | - | Overtime, Night |
| - | - | - | - | - | - | Sick | Sick |
| - | - | - | - | - | - | Vacation | Vacation |
| ... | ... | ... | ... | ... | ... | ... | ... |

FIG. 4

METHOD AND SYSTEM FOR TRACKING TIME AND ATTENDANCE

RELATED APPLICATION

This application is claims benefit to U.S. Provisional Application No. 60/163,432, filed Nov. 3, 1999, the entire teachings of which are incorporated herein by reference.

BACKGROUND OF THE INVENTION

Time and Attendance systems are used primarily in work forces where employees are paid by the hour, and where records of start and stop time must be maintained. These records are often called "punches", because a common device used to collect start and stop times is a time-clock, which in its older electromechanical versions, actually punched a timestamp on a time card. Modern time clocks, or terminals, typically use magnetically or optically encoded cards that are "swiped" through a magnetic or optical card reader which records the "punch". Other ways of collecting punches are by a hand-written time sheet, a computer program such as STARstation, a telephone, a cash register, or a biometrics device such as a hand or fingerprint reader.

SUMMARY OF THE INVENTION

The present invention provides a flexible means for easily calculating an employee's compensation based on many different factors.

According to an embodiment of the present invention, a method for calculating an employee's compensation includes associating sets of attributes with pay categories. The employee's shifts are split into sub-shifts, responsive to work parameters. A set of attributes is determined for, or associated with each sub-shift. A pay category is determined with which the set of attributes is associated. The pay category is associated with the sub-shift, and compensation for the employee is determined for the sub-shift, responsive to the assigned pay category.

Preferably, each set of attributes is a unique combination of attributes.

Work parameters can include, but are not limited to, workplace rules, scheduled time, holiday calendars, dates and times of the shift.

A subshift includes one or more contiguous intervals having common attributes.

In at least one embodiment, sets of attributes are associated with pay categories through a mapping which maps each set of attributes to one or more pay categories. The pay categories with which the set of attributes associated with a particular subshift is associated are then determined responsive to the mapping. This mapping is preferably configurable by a user, or administrator.

A total compensation for an employee can then be determined for a pay period by adding the amounts determined for each subshift of the pay period mapped against the pay rate.

A compensation qualifier can be associated with each pay category, such that determining compensation for an employee for the sub-shift responsive to the assigned pay category, is in turn responsive to the employee's base pay and the compensation qualifier.

Plural compensation qualifiers can be associated with a pay category, each compensation qualifier being in effect, for example, for a different time of day.

The compensation qualifier can be a pay multiplier, wherein compensation for the employee for the sub-shift is determined by multiplying the employee's base pay by the pay multiplier. Alternatively, the compensation qualifier can be a pay adder, wherein compensation for the employee for the sub-shift is determined adding the pay adder to the employee's base pay. Alternatively, both a pay multiplier and a pay adder can be used together.

In addition, the compensation qualifier can comprise bonus time, wherein compensation for the employee for the sub-shift is determined by awarding the employee bonus time. In one embodiment, the bonus is added only if a specified minimum time requirement is met. Alternatively, bonus time is a specified amount of bonus time. In yet another alternative, bonus time is a specified percentage of time worked during a specified interval.

One or more pay categories can be tracked. For each tracked pay category, an overflow threshold is specified that is a maximum amount of time that can be accrued in the pay category. A second pay category is specified to receive any amount of time originally assigned to the tracked pay category which is in excess of the threshold. This can be done over various time periods, such as per day or per week.

An employee's actual compensation is calculated based on actual attendance and applicable compensation rules, based on collected punch information. Punch information can be collected, for example, by a reader through which encoded cards are swiped, or by a biometric device, and then stored in a database. Punch information typically includes any or all of IN/OUT information, timestamps, and break indications.

In addition, an employee's budgeted compensation can be calculated based on the employee's assignment schedule. Similarly, an employee's forecasted compensation can be calculated based on the employee's actual attendance for a selected period, and the employee's assignment schedule.

Determining compensation for an employee for some sub-shift is responsive to a pay policy.

A completed shift is formed, responsive to identified or stored transactions, including in punches and out punches, and the employee's schedule.

Each sub-shift is classified as to which attributes are in effect. Attributes include, but are not limited to, any or all of premiums, special pay/exceptions, overtime, schedule deviation, holidays, and specially designated days.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a table illustrating a pay category matrix map as employed by the present invention.

DETAILED DESCRIPTION OF THE INVENTION

Figure 1:
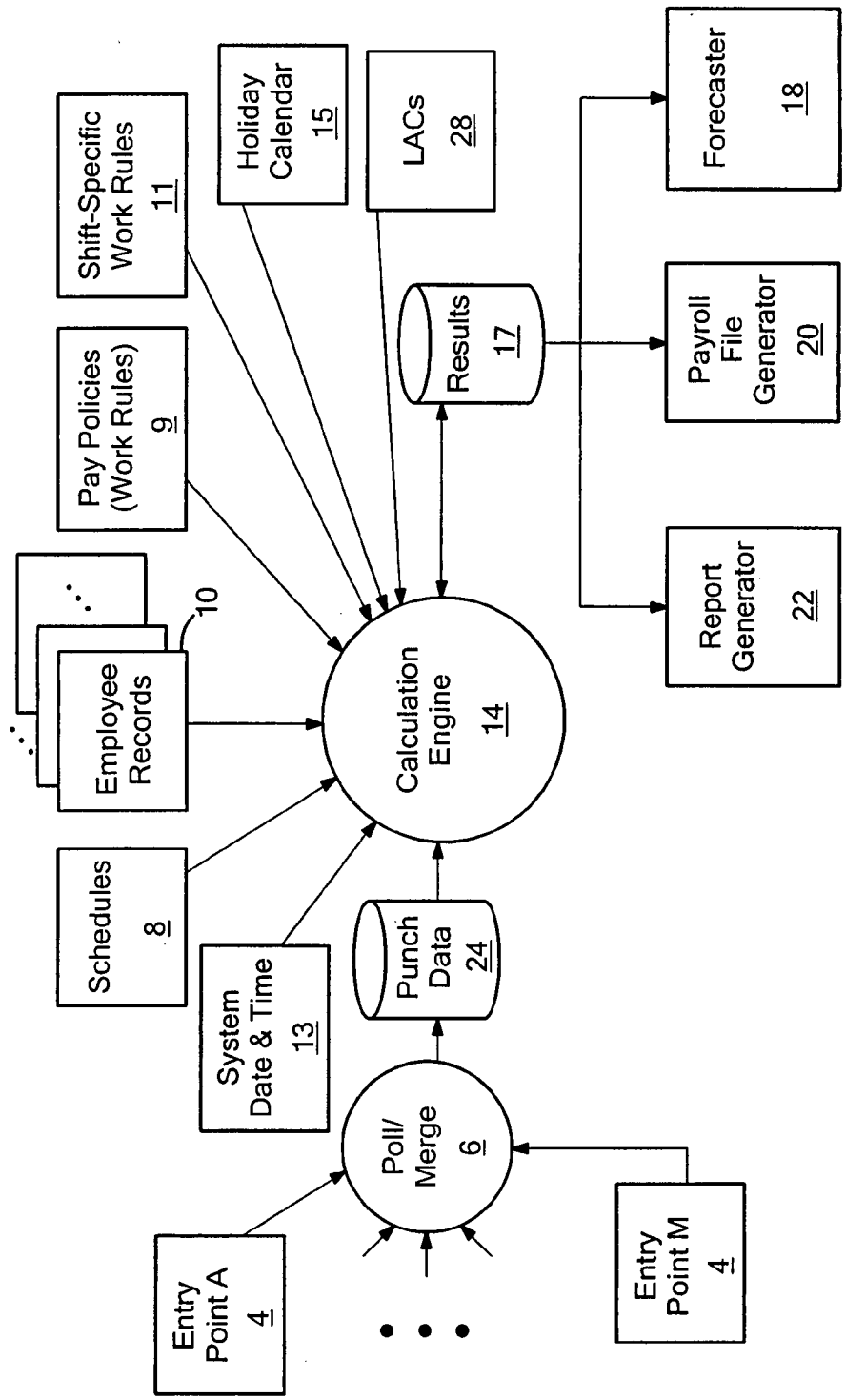
FIG. 1 is a high-level schematic diagram of an embodiment of the time and attendance system which employs the present invention.

FIG. 1 is a high-level schematic diagram of an embodiment of the time and attendance system of the present invention. Punches are entered at one or more entry terminals 4, which are polled by a poller/merger 6. The punch data is then merged into a database 24.

A calculation engine 14 interprets the punches stored in the database 24 and calculates the amounts and types of compensatory time employees should be awarded for their work. The calculation engine 14 also determines employees' actual attendance in relation to their scheduled attendance 8. To accomplish this, the calculation engine 14 obtains basic information about the employees from their employee records 10. These records 10 associate employees with basic rule sets, called "pay policies" 9, that contain the basic rules for the time and attendance calculations for the employees. In addition, more detailed rules are obtained from shift specific work rules 11. Other inputs to the calculation engine 14 include system date and time 13 and a holiday calendar 15, i.e., a list of holidays.

The employee records 10 define a number of attributes for the employees, including up to ten labor allocation classes (LACs) 28. LACs 28 can define, for example, an employee's default position in the employer's business structure, e.g., department, job, etc. The employee's base pay rate can be derived from the values of the LAC fields.

The results 17 of the calculation engine 14, include information such as work time, overtime, special pay, time-based benefits such as vacation time, etc., and can be tallied, for example, by job, by employee, by pay category, or by time period such as a week. The results 17 can be used by a report generator 22 to generate an assortment of reports such as exceptions, total hours, attendance, etc., and by a payroll engine 20 to generate a file in the precise format required by a payroll service to produce paychecks. Finally, the results 17 can also be used by a forecaster 18 to forecast future labor requirements.

A pay policy 9 is a set of basic rules describing how time and attendance should be calculated for a group of employees. Any number of pay policies can be defined. Each pay policy states, for example, whether employees are hourly or salaried, the pay period length, the pay period and overtime period commencement dates, the logical day start, etc. In addition, a pay policy can refer to a "holiday group" that specifies the holidays applicable to the employees, as well as to default work rules for the employees associated with the pay policy.

To determine an employee's compensation for worked time, vacation time, sick time, etc., the concept of a "shift" is usually used. The term "shift" typically, but not always, refers to a contiguous period of time in which an employee is performing his work duties, with the exception of shorter periods of time called "breaks".

Figure 2:
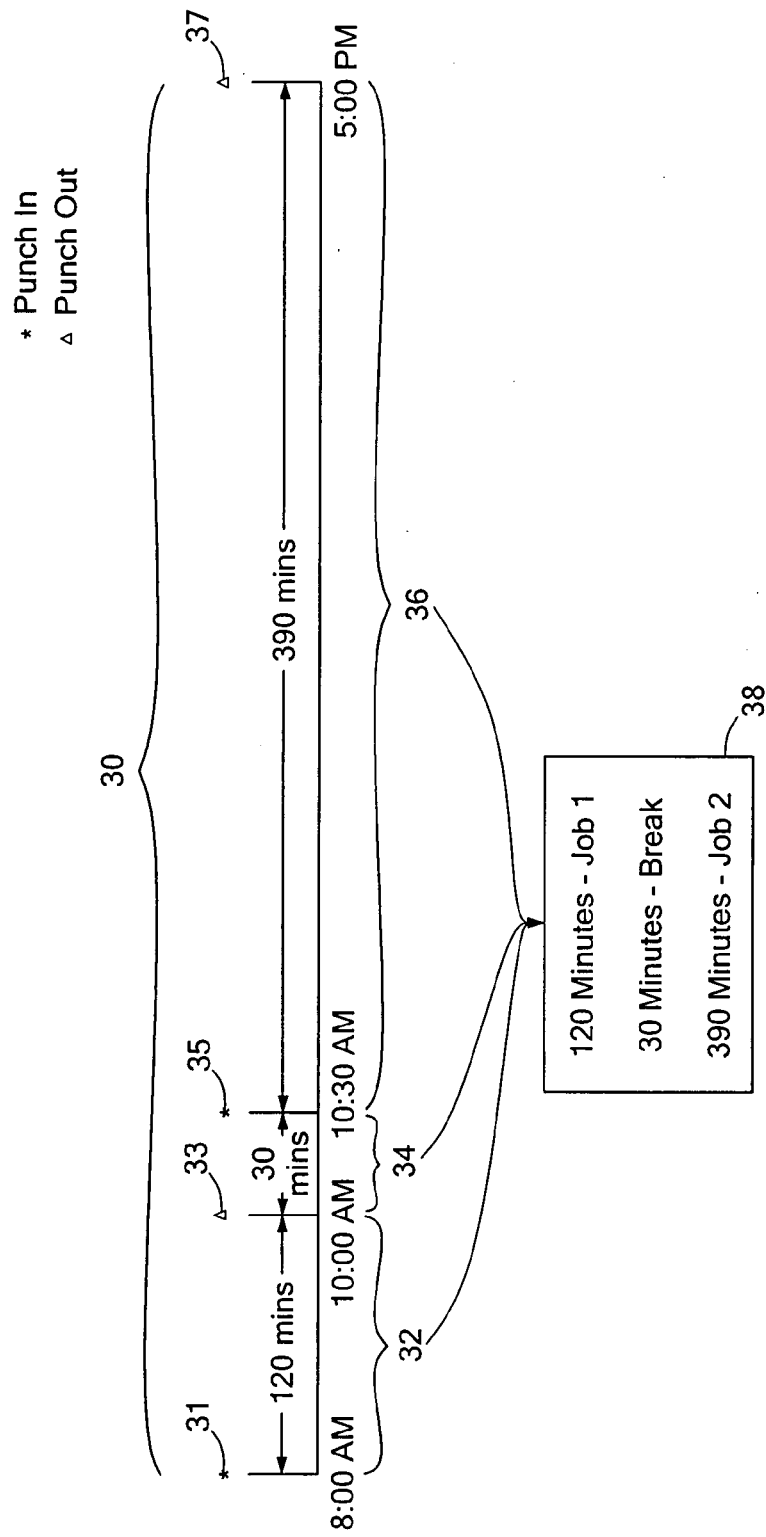
FIG. 2 is a schematic diagram illustrating a shift.

For example, FIG. 2 is a time line illustrating an exemplary shift 30, in which an employee begins work at 8:00 am, indicated by a punch in 31. The employee has punched out 33 at 10:00 am, so that 120 minutes have been accumulated for the first subshift 32. The employee has taken a thirty-minute break 34, at the end of which, at 10:30 am, he has punched back in 35. Finally, at 5:00 pm, he has punched out 37, defining another subshift 36 having a duration of 390 minutes.

Although not necessary, the example of FIG. 2 assumes that the employee is performing different duties or having different LAC assignments during subshift 36 than during subshift 32. For example, during subshift 32, the employee is performing Job 1 which might be operating a cashier for Department A, while during subshift 36, the employee is performing Job 2 which might entail stocking shelves for Department B. The accumulated times for each subshift are shown in box 38.

A shift is usually associated with a set of compensation rules called work rules 11 (FIG. 1). Work rules specify, for example, the breaks to which an employee is entitled while working the shift, applicable overtime rules, rounding rules for an employee's punches during the shift, exception rules, guaranteed shift length, shift assignment date, maximum shift length, etc.

Employees earn time based on actual punches or based on scheduled special pay. Actual punches come in a number of different varieties. Of most interest for the calculation engine are IN/OUT punches, transfer punches that change as employee's LAC assignment at specified times and special pay punches that awards the employees special pay. The actual punches and the scheduled special pays are referred to as "transactions".

A set of transactions that occur during a limited contiguous period of time can usually be associated with a shift and a set of work rules. Once this association is made, the set of transactions itself is referred to as a "shift". The process of associating a set of transactions with a shift and a work rule is referred to as "shift assignment". The determination of which transactions should be included in the set is called "shift mapping". These two processes, shift assignment and shift mapping, are closely tied together in a sometimes iterative process.

The earliest transaction in a shift, i.e., in a set of transactions, must be identified. This is usually, but not always, the employee's earliest transaction that has not already been assigned to a completed shift. Based on this earliest transaction, one or more shifts qualified for the shift assignment can be found. Among these shifts, the best match is selected for the shift assignments.

Once the transactions forming a completed shift have been identified, the amount of compensatory time to be awarded to an employee for various categories is calculated. This calculation is based on information from the employee record 10, from the employee's pay policy record 9, from the applicable work rules 11 and from some additional sources described below.

In at least one embodiment, each employee can be assigned default values for up to ten labor allocation classes (LACs) which define, for example, the employee's position in the business structure. In simple situations, all time earned in a shift is associated with the employee's default or "home" LACs, for example with the employee's home department and the employee's default job.

However, employee LAC assignments can be overridden at any time in a shift. LAC overrides can be accomplished by LAC transfers in the employee's schedule or in the employee's punches. From a business standpoint, this means that an employee can, during a shift, earn time from different departments, different jobs, different locations, etc.

Some or all of the compensatory time an employee is awarded can be designated as special pay. One of the many uses of special pay is to award the employee earned benefits such as personal holidays, vacation and sick pay. Any number of special pay categories can be defined. In one embodiment of the present invention, each special pay category is given a unique name and assigned a number of attributes. Special pay can be awarded in a number of ways.

For example, a punch can specify that an employee should be awarded a certain amount of special pay time of a specified special pay category.

In addition, an entry in an employee's schedule can specify that the employee should be awarded an amount of special pay. This entry can either specify the exact time when the special pay should take effect, or just a date can be specified.

Paid breaks can be defined to award employees special pay. Holidays can also be defined for which to award employees special pay. In addition, the rules for a shift can specify that all time awarded in the shift be paid as special pay. Finally, special pay can be awarded for all shifts assigned to certain weekdays.

Overtime is awarded, in at least one embodiment, when an employee works more than specified amounts of time in a shift, in a day or in a period of one or several weeks. Overtime can also be awarded based on the amount of consecutive time worked in a shift, or based on the number of consecutive days worked in a period, etc.

Not all worked time necessarily counts toward the overtime thresholds. For example, certain time awarded as premium pay or special pay may be disqualified for overtime. In defining premiums and special pays the user specifies whether they qualify for overtime or not.

Employees can be awarded different levels of overtime pay after having worked more than specified threshold amounts of qualifying time in a day. Optionally employees can be required to work minimum amounts of time during the day before any "daily overtime" at all is awarded. For example, an employee can be awarded overtime category OT1 after 8 hours in a day, and OT2 after 12 hours with the provision that the employee must work a minimum of 11 hours during the day get any overtime at all.

In one embodiment, a daily overtime accumulator can be reset before and after each shift, every time the shift assignment date changes, when the employee works past a specified time of day or at logical day start, or at the earliest of (a) the employee's rounded IN punch to a shift and (b) the nominal shift begin time. Then, if the employee is punched in 24 hours later for the same or a different shift, the cumulative daily OT is reset again and a new 24 hour period is started.

If a new shift starts after the end of the preceding 24 hour period, then the original rule applies.

A variation of the "normal" daily overtime is "consecutive time overtime", in which overtime is awarded to employees who have worked more than specified amounts of time consecutively in one shift, i.e., without punched breaks.

One factor used in calculating "consecutive time overtime" is the threshold level of "consecutive time worked" after which the "consecutive time overtime" is awarded. In one embodiment, five thresholds can be specified. Another factor is the minimum consecutive time worked to qualify for any consecutive time overtime at all. The minimum amounts may be different for each weekday as well as for holidays. Yet another factor is whether paid and/or unpaid breaks should be ignored at the determination of consecutive time. Finally, another factor is whether consecutive time overtime will be awarded for the balance of the shift once the threshold has been reached, or whether this overtime will cease at the first punched break.

"Period overtime" is awarded when the total amount of time (qualified for overtime) worked over a period of several days exceeds specified threshold values. The duration of the overtime period can be specified to a fixed period of, for example, one week, two weeks or four weeks.

Two separate period overtime accumulators are used in one embodiment of the present invention. Each accumulator is processed independently of the other. For example, an employee can be awarded weekly overtime level 1 after 40 hours and biweekly overtime level 1 after 100 hours.

In addition to calculating 'fixed period' overtime the calculation engine can calculate overtime based on the number of consecutive days, or 'days in a week' an employee works. In one embodiment, three tiers of consecutive day overtime are available, defined as follows.

First, assume that normally after N consecutive days, overtime level 1 (OT1) is paid after N1 hours, overtime level 2 (OT2) is paid after N2 hours . . . , overtime level 5 (OT5) is paid after N5 hours, where N, N1, . . . N5 are specified for each tier.

As an example of using all three tiers of consecutive day overtime, say an employee is normally awarded daily overtime level 1 after 8 hours and daily overtime level 2 after 10 hours. Tier 1 dictates that after having worked five consecutive days, the employee receives OT1 after 6 hours and OT2 after 8 hours. Tier 2 dictates that after having worked seven consecutive days, the employee receives OT1 after 4 hours and OT2 after 5 hours. Finally, according to tier 3, after having worked nine consecutive days, the employee receives OT1 after 1 hour and OT2 after 2 hours. Of course, other rules could apply and the number of tiers is not restricted to three in alternative embodiments.

Employees can also be awarded premium compensation for certain times of the day or time periods of the week. Premium pay can be specified, for example, as a percentage of the base pay, as an additional pay per hour or as a combination of the two. For example, employees might be paid one dollar per hour over base pay from 7:00 pm to 6:00 am every day and 110% of base pay on Saturdays and Sundays.

In one embodiment, premium times can be specified in two different manners, either for certain weekdays, for example for every Sunday from 2:00 pm to 8:00 pm, or for certain time periods of the week, for example from 8:00 pm on Fridays to 10:00 pm Sundays. The term 'day-based premiums' is used herein for the former and the term 'interval-based premiums' for the latter.

A "day-based premium" is composed of one or several day-based premium segments, such as 8:00 pm to 10:00 pm, Monday and Wednesday, or 8:00 pm to 10:00 pm everyday, Monday through Friday.

Once all time segments of a day based premium have been defined, the following applicability decisions must be made.

First, will the premium be awarded only for work performed during the exact times? For example, an employee working from 8 am to 11 pm might only get premium pay from 8 pm to 10 pm.

Second, will the premium be awarded for the entire shifts that were scheduled to start and/or end during the time segments specified above?

Third, will the premium be awarded for the entire shifts for employees who punch IN for work and/or punch OUT from work during the time segments specified above?

Finally, will the advanced premium rules described below be required to describe the applicability of the premium?

An "interval based premium" is composed of one or several premium intervals. Each interval is specified with a beginning workday and time, and an ending weekday and time, for example, from Friday 8 pm until Monday 7 am.

The employee can then be awarded different premiums during the respective time periods. Alternatively, one of the premiums may be considered to override the other premiums. In this case the overriding premium is awarded for the entire time period when any premium was in effect.

Weekend differential is an interval-based premium—typically from Friday evening to Monday morning—that is awarded to employees who have worked a specified minimum amount of time during the premium interval. The required minimum must be met by summing all worked time for all shifts worked during the weekend premium interval.

Baylor pay is an interval based premium that awards bonus payments for each shift for which a specified 'minimum time' requirement has been met. The 'minimum time worked' requirement must be met (1) for each shift and (2) entirely inside the baylor pay premium interval. Once the minimum has been satisfied for a shift, the employee will, in addition to his/her worked time, either be awarded (1) a specified amount of bonus time or (2) a bonus time that amounts to a certain percentage of his/her worked time, up to a specified maximum.

Schedule deviation provides the means to award employees different compensation whenever they work unscheduled time. The schedule deviation can apply to the time worked in a scheduled shift that precedes the scheduled shift start; and/or the worked time in scheduled shift that occurs after the scheduled shift end; and/or all worked time in unscheduled shifts.

On Call/Call In Compensation applies to situations where employees, for specified periods of time—typically a weekend, are available to be 'called in' to work if the need arises. An 'On Call' employee is usually paid a certain amount per hour ('On Call ' pay) for being available. If called in to work, he receives a different, or an additional, 'Call In' pay. Sometimes employees are credited a certain minimum amount of 'Call In' time for each occasion they are called in. Employees may also receive compensation for travel expenses and travel time every time they are called in.

An employee's holidays can be defined in the holiday calendar referenced in the employees pay policy. Any number of holiday calendars can be created and each calendar lists all the holidays applicable to a group of employees.

The first steps in the calculation of an employee's compensation involve schedule analysis, shift assignment, determination of applicable work rules, punch rounding, processing of breaks, premium periods, special pays, holidays, overtime, etc., as discussed previously. When this information has been processed, each segment or subshift of the employee's compensatory time is classified as to which attributes, if any, are in effect, including but not limited to, premiums, special pay, overtime, schedule deviation, a holiday or any other specially designated day, etc.

Figure 3:
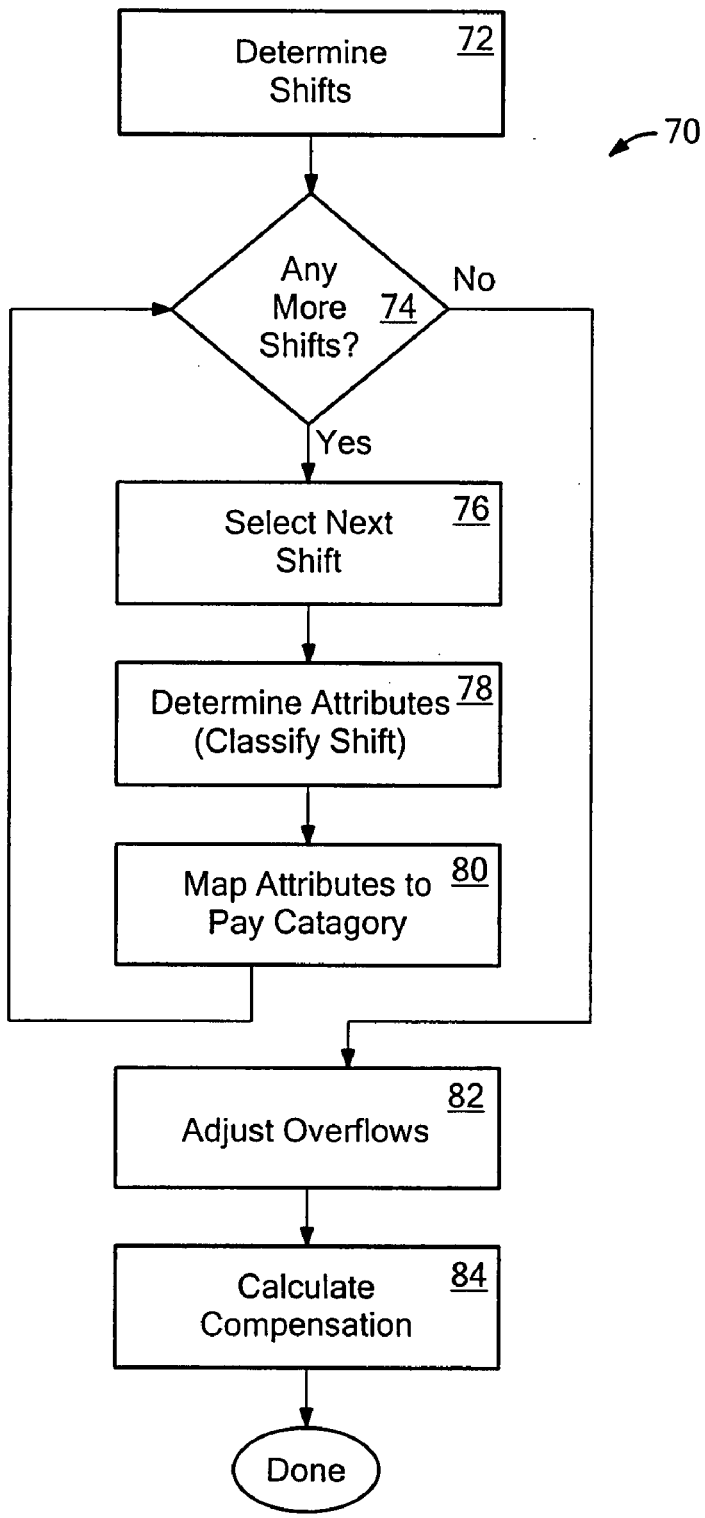
FIG. 3 is a flowchart of the process used by an embodiment of the present invention.

FIG. 3 is a flowchart of the process used by an embodiment of the present invention, performed for each employee over some period such as a week. In step 72, the shifts worked by the employee or otherwise awarded to the employee are determined, primarily from punches entered at the terminals 4, but also in response to, for example, holidays.

If, at step 74, there are unprocessed shifts, one of the shifts is selected at step 76. At step 78, the shift is classified. That is, the shift is determined to have certain attributes. These attributes can be related to, for example, the specific job being performed, a level associated with the employee, overtime, evening, sick-time, vacation, holiday, on-call status, etc.

At step 80, a determination is made as to how each time segment or subshift having some combination of these attributes should be paid. This process maps an employee's compensatory hours to one or more pay categories using a Pay Category Mapping Matrix, discussed below with respect to FIG. 4.

Steps 74-80 repeat until each shift determined in step 72 has been mapped to one or more pay categories. Then, in step 82, pay categories on which limits or thresholds have been placed are checked, and any overflows are processed by moving the excess to another category, or simply by ignoring the excess.

Finally, in step 84, compensation for the pay period is calculated by first determining compensation for each pay category according to the time awarded to the pay category and to pay rules associated with the pay categories, and then summing the compensation over all pay categories.

FIG. 4 illustrates an exemplary Pay Category Mapping Matrix 100. Across the top are listed various attributes 101, including Daily Overtime (O/T), Weekly Overtime, various Primary attributes and Special Pay. Each row 103 in the matrix 100 defines a unique combination of attributes. Note that attributes can also have different levels. For example, various levels of Weekly Overtime are available, although only Level 1 is shown. Each level contributes to a distinct attribute combination. The right hand column 105, labeled Pay Category, provides, for each unique combination or set of attributes, one or more applicable pay categories associated with that unique combination. Thus each unique set of attributes 103 is mapped to at least one pay category 105.

For example, row 103A applies to subshifts having only the attributes of Weekly Overtime Level 1, and Evening. Such a subshift is mapped to both the Overtime and Night pay categories.

Figure 5:
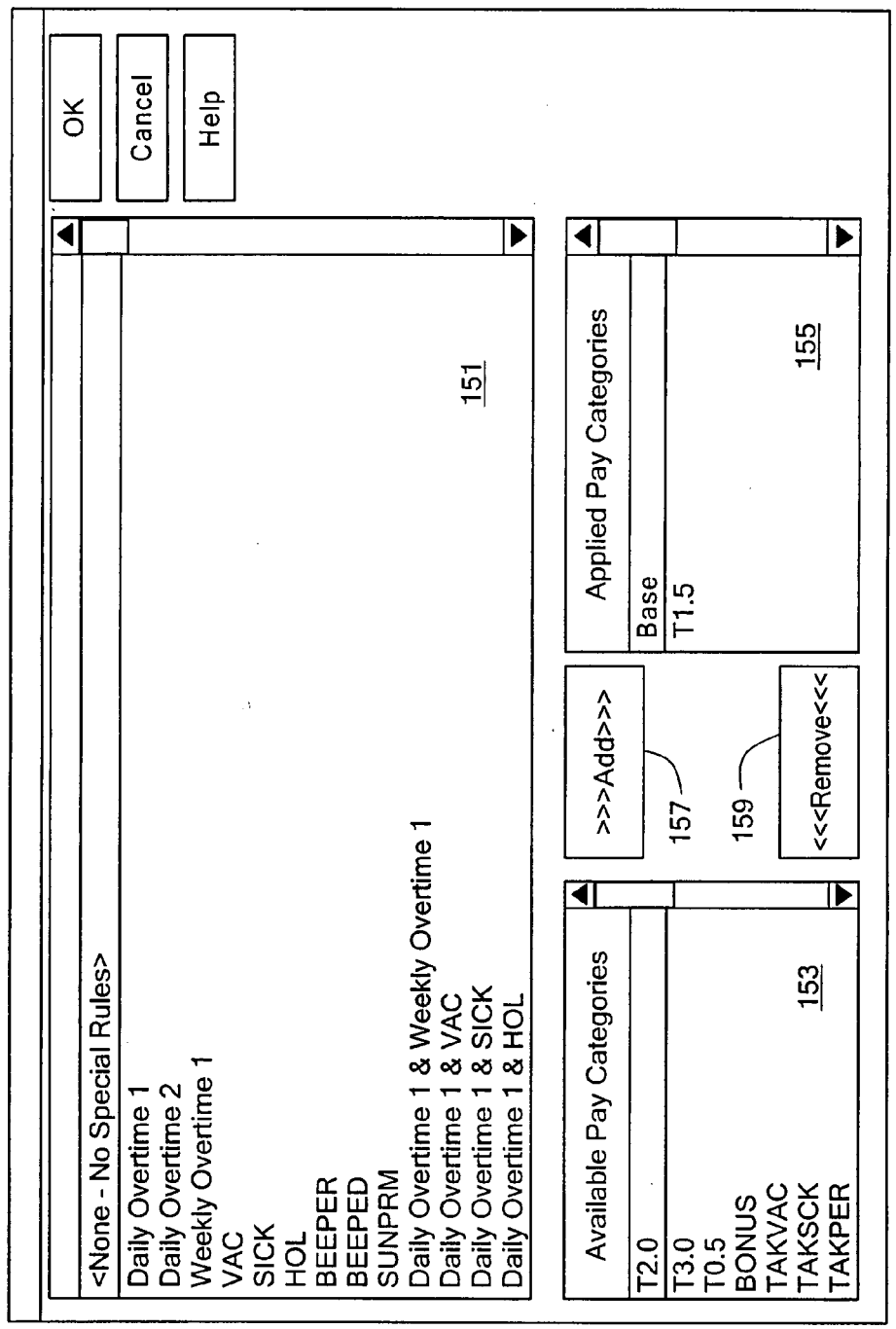
FIG. 5 is a screen shot of a graphical user interface used to configure the table of FIG. 4.

FIG. 5 illustrates a Pay Category Mappings Configuration Dialog 150 which allows the user to map all possible hours types and combinations to Pay Categories.

The Rules Conditions and Combinations list 151 displays all possible combinations of hour or shift types or attributes. When an administrator clicks on a line in this dialog, the Applied Pay Categories list 155 and Available Pay Categories lists 153 are updated. In at least one embodiment, a subshift attribute can be, for example, one of the following: Regular, Daily Overtime (1-5), Weekly Overtime (1-5), Consecutive Hour Overtime (1-5), Consecutive Day Overtime, Premium <premium category code>, Premium Weekend Differential, Premium Baylor, or Special Pay Code.

The Applied Pay Categories list 155 displays the Pay Categories which are associated with the combination of attributes selected in the Rules Conditions and Combinations list 151. The Available Pay Categories list 153 displays Pay Categories which are not associated with the selected attribute combination. If the administrator selects a Pay Category in the unavailable list 153 and clicks the add button 157, the selected Pay Category is moved from the available list 153 to the Applied Pay Categories list 155. If the user selects a Pay Category from the applied list 155 and clicks the remove button 159, the Pay Category is moved from the applied list 155 to the available list 153.

Once an employee's compensatory hours have been mapped into pay categories, a determination is made as to whether the total numbers of hours in any pay category exceeds a specified daily or weekly overflow threshold (Step 82 of FIG. 3).

Compensation is awarded to employees according to the mapped pay categories. The cumulative amounts accrued in these pay categories can be tracked on a daily and a weekly basis. When the cumulative amount of time in a pay category exceeds a specified "overflow threshold," the excess amount of time can be directed to a different pay category. For example, when an employee has accrued more than 12 hours in the 'Call In Travel Time' pay category in a week, the excess time will be paid at a lower paying pay category—or perhaps not be paid at all.

In one embodiment, every pay category can be tracked on a daily basis and on a weekly basis. For each tracked category, the maximum amount of time that can be accrued in that pay category, and the pay category to which the excess amount of time is to be assigned must be specified.

The description of the calculations module thus far has dealt primarily with actual data—i.e. with the employee's actual attendance and with the amount of compensation the employees should receive based on their actual punches. In addition to calculating actual compensation the calculations module will be able to calculate the employee's budgeted compensation as well as their forecasted compensation.

Actual, Budgeted and Forecasted compensation differ in the following manners: "Actual compensation" is the compensation employees should receive based on their actual attendance and all applicable compensation rules.

"Budgeted compensation," also called "scheduled compensation," is the compensation employees would receive if they work exactly the days and hours they have been scheduled to work. The calculations of budgeted compensation is entirely based on the employees schedules. The employee's actual attendance is totally irrelevant for the calculations of the budgeted compensation.

"Forecasted compensation" is based on the employee's actual attendance up to the present moment combined with the employee's schedule for the future. Assuming that the employee is properly scheduled, the forecasted compensation for a week (or month or pay period) in progress is the best estimate of the employee's compensation for the week (or month or other pay period).

As an example, suppose an employee is scheduled to work 8 hours per day, Monday through Friday, i.e., 40 hours in a week. No daily overtime is in effect, and the weekly overtime threshold is 40 hours. Assume that the employee actually works 12 hours on Monday and 12 hours on Tuesday. On Tuesday afternoon, the employee's actual compensation, budgeted compensation and forecasted compensation for the week is calculated.

The employee's actual compensation will be calculated based on the 24 hours of regular time actually worked from Monday through Tuesday.

The employee's budgeted compensation will be calculated based on the assigned schedule to work 40 hours of regular time during the week.

Finally, the employee's forecasted compensation will be calculated based on the 12 hours actually worked on Monday and 12 hours actually worked on Tuesday, and based on the assigned schedule to work 8 hours a day from Wednesday through Friday, i.e., a total of 48 hours. The employee is consequently forecasted to work 40 regular hours and 8 hours overtime during the week, that is, 12 hours on each of Monday and Tuesday, and 8 hours on each of Wednesday, Thursday and Friday, (Mon 12 hrs, Tue 12 hrs, Wed 8 hrs, Thu 8 hrs, Fri 8 hrs.)

It will be apparent to those of ordinary skill in the art that methods involved in the present system for tracking time and attendance may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of automatically calculating an employee's compensation, comprising, in a processor:
    associating sets of attributes with pay categories;
    associating a compensation qualifier with each pay category;
    collecting information corresponding to identified transactions, the identified transactions including punch information;
    forming one or more completed shifts, responsive to the identified transactions and the employee's schedule, each of the completed shifts corresponding to at least one scheduled period of work;
    splitting the employee's shifts into a plurality of sub-shifts, responsive to work parameters, each of the plurality of sub-shifts corresponding to at least one scheduled sub-period of work,
    wherein the punch information includes information relating to actual times when at least one of the completed shifts begins and finishes, actual times when each sub-shift within the at least one completed shift begins and finishes, and actual times when the employee changes work assignments during the at least one completed shift, each work assignment corresponding to at least one respective sub-shift within the at least one completed shift; and
    for each sub-shift,
    determining a set of attributes for the sub-shift,
    determining a pay category with which the set of attributes is associated,
    assigning the pay category to the sub-shift, and
    determining compensation for the employee for the sub-shift, responsive to the assigned pay category, the employee's base pay and a compensation qualifier associated with the pay category,
    thereby allowing compensation to be determined for the employee who begins and finishes work at different times during the at least one completed shift, and who has different work assignments during different sub-shifts within the at least one completed shift.

2. The method of claim 1, wherein each set of attributes is a unique combination of attributes.

3. The method of claim 1 wherein work parameters comprise at least one of workplace rules, scheduled time, holiday calendars, dates and times of the shift.

4. The method of claim 1 wherein a subshift comprises one or more contiguous intervals having common attributes.

5. The method of claim 1, wherein:
    associating sets of attributes to pay categories comprises creating a mapping which maps each set of attributes to at least one pay category; and
    determining the at least on pay category with which the set of attributes is associated is responsive to the mapping.

6. The method of claim 5 wherein the mapping is configurable by a user.

7. The method of claim 1, further comprising:
determining a total compensation for an employee for a pay period by adding the amounts determined for each subshift of the pay period.

8. The method of claim 1, wherein the identified transactions occur during a predetermined time period, and further including the step of
automatically making an employee shift assignment including
identifying an earliest transaction from among the identified transactions,
qualifying one or more shifts for association with the identified transactions based on the earliest transaction,
selecting a shift from among the one or more qualified shifts, and
associating the identified transactions with the selected shift.

9. The method of claim 8, further including associating the identified transactions with at least one of the work parameters.

10. The method of claim 9, wherein the work parameters comprise at least one of workplace rules, scheduled time, holiday calendars, and dates and times of the shift.

11. The method of claim 1, wherein plural compensation qualifiers are associated with a pay category, each compensation qualifier being in effect for a different time of day.

12. The method of claim 1, wherein the compensation qualifier comprises a pay multiplier, such that determining compensation for the employee for the sub-shift comprises multiplying the employee's base pay by the pay multiplier.

13. The method of claim 1, wherein the compensation qualifier comprises a pay adder, such that determining compensation for the employee for the sub-shift comprises adding the pay adder to the employee's base pay.

14. The method of claim 13, wherein the compensation qualifier additionally comprises a pay multiplier, such that determining compensation for the employee for the sub-shift comprising multiplying the employee's base pay by the pay multiplier.

15. The method of claim 1, wherein the compensation qualifier comprises a bonus time, such that determining compensation for the employee for the sub-shift comprises awarding the employee the bonus time.

16. The method of claim 15, wherein the bonus is added only if a specified minimum time requirement is met.

17. The method of claim 15, wherein the bonus time is specified amount of bonus time.

18. The method of claim 15, wherein the bonus time is specified percentage of time worked during a specified interval.

19. The method of claim 1, further comprising:
setting a threshold for a first pay category;
defining an overflow pay category; and
calculating, for a given period, a total time awarded to the first pay category; and
if the total time awarded to the first pay category exceeds the threshold, transferring the excess awarded time to the overflow pay category.

20. The method of claim 19, further comprising:
the period is one day.

21. The method of claim 19, further comprising:
the period is one week.

22. The method of claim 1, wherein an employee's actual compensation is calculated based on actual attendance and applicable compensation rules.

23. The method of claim 22, wherein the actual attendance is determined from the collected punch information.

24. The method of claim 23, wherein the punch information is collected by a reader through which encoded cards are swiped.

25. The method of claim 23, wherein the punch information is collected by a biometrics device.

26. The method of claim 23, wherein the punch information is stored in a database.

27. The method of claim 23, wherein the punch information comprises any or all of IN/OUT information, timestamps, and break indications.

28. The method of claim 1, wherein an employee's budgeted compensation is calculated based on the employee's assignment schedule.

29. The method of claim 1, wherein an employee's forecasted compensation is calculated based on the employee's actual attendance for a selected period, and the employee's assignment schedule.

30. The method of claim 1, wherein determining compensation for the employee for the sub-shift is responsive to a pay policy.

31. The method of claim 1, wherein the punch information comprises in punches and out punches.

32. The method of claim 1, wherein each sub-shift is classified as to which attributes are in effect.

33. The method of claim 32, wherein attributes comprise any or all of premiums, special pay, overtime, schedule deviation, holidays, and specially designated days.

34. A method of automatically calculating an employee's compensation for a pay period, comprising, in a data processor:
associating sets of parameters with pay categories, a compensation qualifier being associated with each pay category;
collecting information corresponding to identified transactions, the identified transactions including punch information;
determining one or more time segments responsive to the identified transactions and the employee's schedule,
wherein the punch information includes information relating to actual times when each time segment within the pay period begins and finishes, and actual times when the employee changes work assignments during the pay period, each work assignment corresponding to at least one respective time segment within the pay period;
for each time segment,
determining a set of valid parameters according to a set of rules,
determining a pay category associated with the set of valid parameters, and
calculating the employee's compensation for the time segment responsive to the pay category, the employee's base pay and a compensation qualifier associated with the pay category; and
determining the employee's compensation for the pay period responsive to the calculated compensations determined for time segments within the pay period,
thereby allowing compensation to be determined for the employee who begins and finishes work at different times during the pay period, and who has different work assignments during different time segments within the pay period.

35. A computer program product for automatically calculating an employee's compensation, the computer program product comprising a computer usable medium having computer readable code thereon, including program code which:

associates sets of attributes with pay categories, a compensation qualifier being associated with each pay category;
collects information corresponding to identified transactions, the identified transactions including punch information;
forms one or more completed shifts, responsive to the identified transactions and the employee's schedule, each of the completed shifts corresponding to at least one scheduled period of work;
splits the employee's shifts into a plurality of sub-shifts, responsive to work parameters, each of the plurality of sub-shifts corresponding to at least one scheduled sub-period of work,
wherein the punch information includes information relating to actual times when at least one of the completed shifts begins and finishes, actual times when each sub-shift within the at least one completed shift begins and finishes, and actual times when the employee changes work assignments during the at least one completed shift, each work assignment corresponding to at least one respective sub-shift within the at least one completed shift; and for each sub-shift,
determines a set of attributes for the sub-shift,
determines a pay category with which the set of attributes is associated,
assigns the pay category to the sub-shift, and
determines compensation for the employee for the sub-shift, responsive to the assigned pay category, the employee's base pay and a compensation qualifier associated with the assigned pay category,
thereby allowing compensation to be determined for the employee who begins and finishes work at different times during the at least one completed shift, and who has different work assignments during different sub-shifts within the at least one completed shift.

* * * * *